United States Patent
Trotabas et al.

(10) Patent No.: US 8,891,912 B2
(45) Date of Patent: Nov. 18, 2014

(54) OPTICAL RIBBON AND METHOD OF FORMING SAME

(75) Inventors: Remy Trotabas, Nashua, NH (US); Semyon Tkach, Glenview, IL (US); Gennady Genchanok, Buffalo Grove, IL (US)

(73) Assignee: Molex Incorporated, Lisle, IL (US)

(*) Notice: Subject to any disclaimer, the term of this patent is extended or adjusted under 35 U.S.C. 154(b) by 1389 days.

(21) Appl. No.: 12/602,362

(22) PCT Filed: May 31, 2007

(86) PCT No.: PCT/US2007/070077
§ 371 (c)(1),
(2), (4) Date: Nov. 9, 2011

(87) PCT Pub. No.: WO2008/147414
PCT Pub. Date: Dec. 4, 2008

(65) Prior Publication Data
US 2012/0045166 A1    Feb. 23, 2012

(51) Int. Cl.
*G02B 6/44* (2006.01)
*G02B 6/43* (2006.01)

(52) U.S. Cl.
CPC .............. *G02B 6/448* (2013.01); *G02B 6/4403* (2013.01); *G02B 6/43* (2013.01)
USPC ............................................ 385/14; 29/527.2

(58) Field of Classification Search
None
See application file for complete search history.

(56) References Cited

U.S. PATENT DOCUMENTS

| 4,496,215 | A | | 1/1985 | Shaheen et al. | |
|---|---|---|---|---|---|
| 5,155,785 | A | * | 10/1992 | Holland et al. | 385/89 |
| 6,721,042 | B1 | | 4/2004 | Sun et al. | |
| 7,509,009 | B2 | * | 3/2009 | Suzuki et al. | 385/114 |
| 7,532,782 | B2 | * | 5/2009 | Bragg et al. | 385/14 |
| 2004/0120631 | A1 | | 6/2004 | Kim et al. | |
| 2004/0161212 | A1 | | 8/2004 | Sun et al. | |

FOREIGN PATENT DOCUMENTS

| EP | 1 103 832 A2 | | 5/2001 |
|---|---|---|---|
| EP | 1 548 477 A1 | | 6/2005 |
| JP | 62123406 A | * | 6/1987 |

OTHER PUBLICATIONS

International Search Report for PCT/US07/70077.

* cited by examiner

*Primary Examiner* — Sarah Hahm
(74) *Attorney, Agent, or Firm* — Timothy M. Morella

(57) ABSTRACT

An optical ribbon (20) includes at least one optical fiber and a conformal coating at least substantially encapsulating said at least one optical fiber. The optical ribbon is flat and has a generally curved section (42) which can be routed around components (40) on a printed wiring board (22) or can be used as a built-in ferrule retermination loop.

11 Claims, 3 Drawing Sheets

OPTICAL RIBBON AND METHOD OF FORMING SAME

FIELD OF THE INVENTION

This invention is generally directed to an optical ribbon in an optical flex circuit and/or cable assembly.

BACKGROUND OF THE INVENTION

Generally, current optical ribbon technology limits ribbon geometry to a straight line. When such fiber optic ribbons have to follow a curved path on an optical board, the accuracy of the routing is compromised. In some cases, the fiber optic ribbons may rub against abrasive surfaces such as FR4 laminate or heat sinks. In particular, as telecom system components, such as ASICs and optical transceivers, generate ever-increasing amounts of heat, fans are used to cool the components by generating powerful air flows. These air flows may cause the optical ribbons vibrate against the abrasive surfaces, resulting in possible damage to the optical ribbon.

Forcing prior art optical ribbons into curved paths, or installing the ribbon in a way that forces the optical ribbon to bend in any plane other than perpendicular to its surface, subjects the optical ribbon to permanent torsional stresses that reduce the optical ribbon's life expectancy. Over time, the optical ribbon, in particular, ribbons without jackets, may split. Because all parallel optic transceivers currently on the market feature an interface orientation parallel to the printed wiring board on which the transceivers are mounted, most optical ribbons are in permanent torsional stress.

In addition, when numerous optical ribbons are to be assembled on a board, a constraining assembly sequence must be determined and followed during assembly. Furthermore, height limitations (if no curved ribbon cross-over is allowed) may create significant design constraints when the straight optical ribbons are used.

U.S. Pat. No. 4,496,215 to Shaheen et al. provides a flat optical ribbon which can include a curved pattern (as shown in FIG. 3 of the '215 patent). The optical fibers are embedded in a resin layer in a predetermined pattern. Thereafter, first and second surfaces layers are laminated to the resin. The first and second surface layers provide structural support to the optical fibers to protect the optical fibers from tensile and shear stresses. While this provides the ability to have a flat optical ribbon which can include a curved pattern, the substrates increase the cost of manufacturing the ribbon.

The present invention provides an optical flex circuit and/or cable assembly which overcomes the problems presented in the prior art and which provides additional advantages over the prior art, such advantages will become clear upon a reading of the attached specification in combination with a study of the drawings.

OBJECTS AND SUMMARY OF THE INVENTION

A general object of the present invention is to provide a generally flat optical ribbon for use in an optical flex circuit and/or cable assembly which includes a curved section.

An object of the present invention is to provide a generally flat, flexible ribbon which is simply and accurately manufactured.

Another object of the present invention is to provide a generally flat ribbon which can be placed on a printed wiring board with accuracy and without torsional stress.

Yet another object of the present invention is to provide a generally flat ribbon which provides for on-board fiber management solutions.

A further object of the present invention is to provide a generally flat optical ribbon which includes a curved section that can be installed with no intra-ribbon stress, increasing the life expectancy of the ribbon.

Yet a further object of the present invention is to provide a generally flat optical ribbon which includes a curved section that allows for precise, permanent and repeatable ribbon routing, ensuring clearance with other components on the printed wiring board.

An even further object of the present invention is to provide a generally flat optical ribbon which includes a curved section that enables higher fiber density and simplifies design constraints and design time.

Briefly, and in accordance with the foregoing, the present invention discloses an optical ribbon includes at least one optical fiber and a conformal coating at least substantially encapsulating said at least one optical fiber. The optical ribbon is flat and has a generally curved section which can be routed around components on a printed wiring board or can be used as a built-in ferrule retermination loop.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
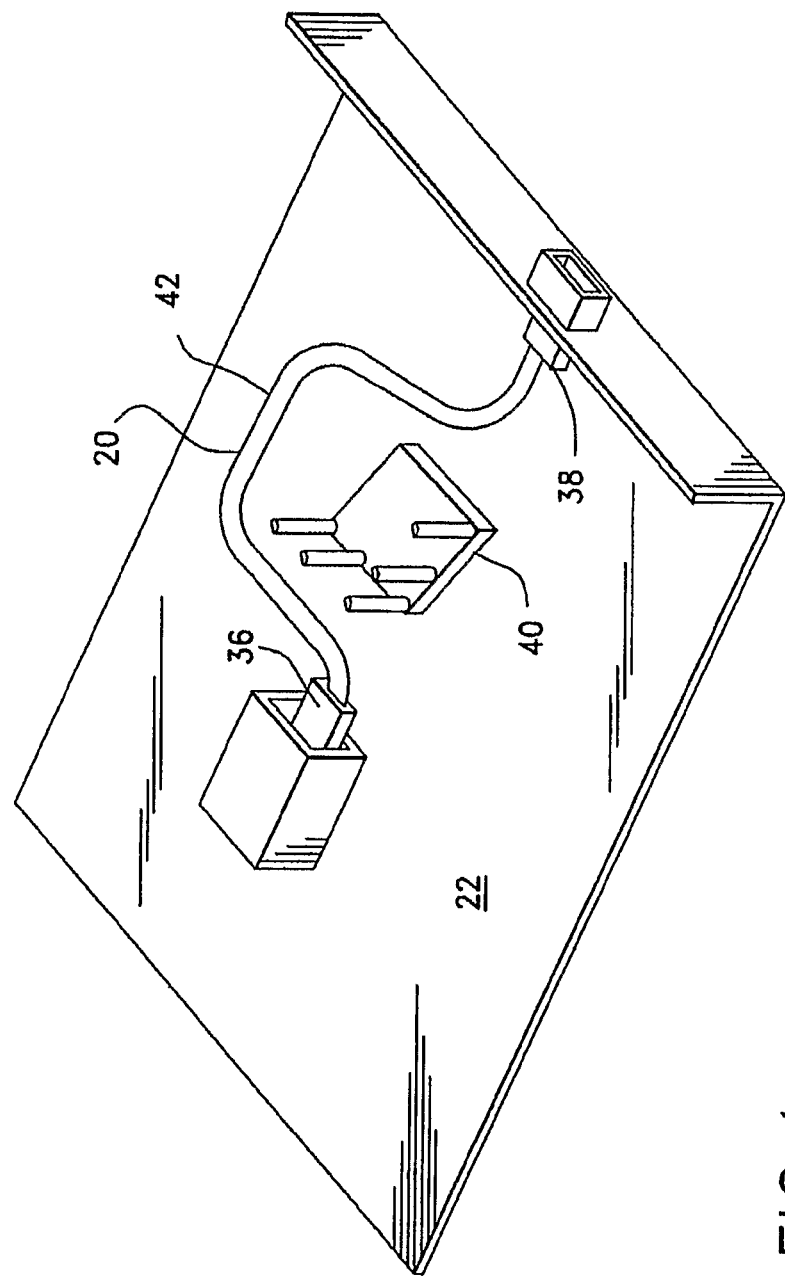
FIG. 1 is a perspective view of an optical ribbon which incorporates the features of the present invention mounted on a printed wiring board.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

An optical ribbon 20 is provided for use in an optical flex circuit and/or cable assembly. The optical ribbon 20 may be mounted on a printed wiring board 22.

The optical ribbon 20 includes at least one optical fiber 24a which is substantially encapsulated with a conformal coating 26 to form the optical ribbon 20. Preferably, at least two optical fibers 24a, 24b are provided and are positioned side-by-side to each other to form a flat ribbon. The term "flat" as used herein means that the upper surface 28 of the optical ribbon 20 is substantially planar, the lower surface 30 of the optical ribbon 20 is substantially planar, and the upper surface 28 and the lower surface 30 are substantially parallel to each other along the length of the optical ribbon 20. As shown, four optical fibers 24a, 24b, 24c, 24d are shown positioned side-by-side to each other to form a flat ribbon although it is to be understood that more than four optical fibers can be provided. The optical fibers 24a, 24b, 24c, 24d can touch each other as shown in the drawings, or can be spaced apart from each other such that the conformal coating 26 is provided between the optical fibers 24a, 24b, 24c, 24d. In the following, four optical fibers 24a, 24b, 24c, 24d are discussed, however, it is to be understood that fewer than or more than four optical fibers can be provided.

Figure 2:
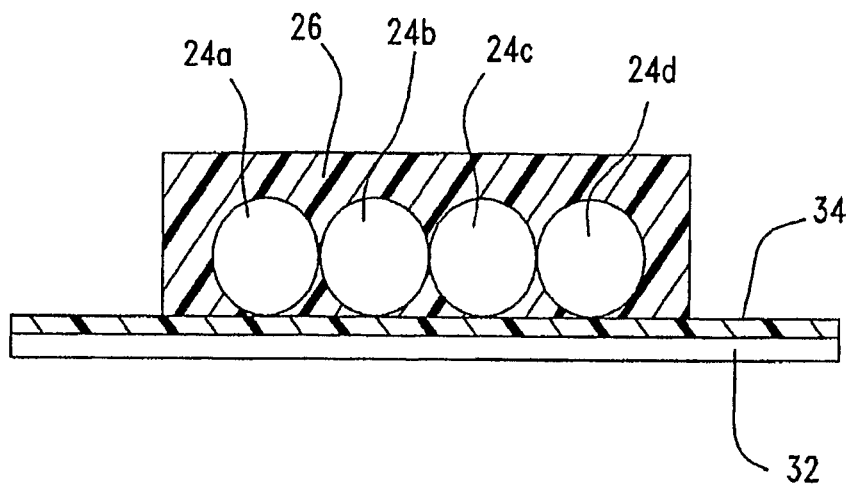
FIG. 2 is a cross-sectional view of the optical ribbon of FIG. 1 during manufacture.
Figure 5:
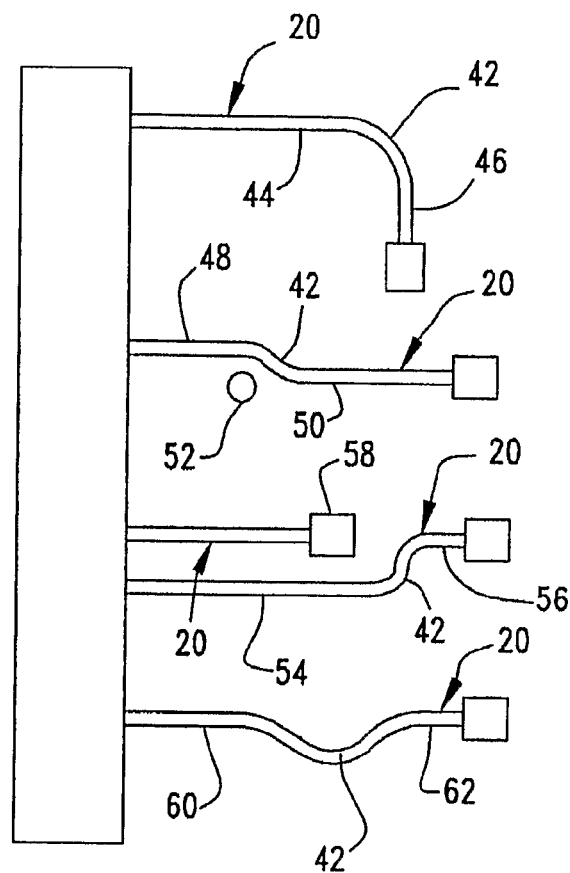
FIG. 5 is a top plan view of possible patterns which the optical ribbon of the present invention can be routed.
Figure 6:
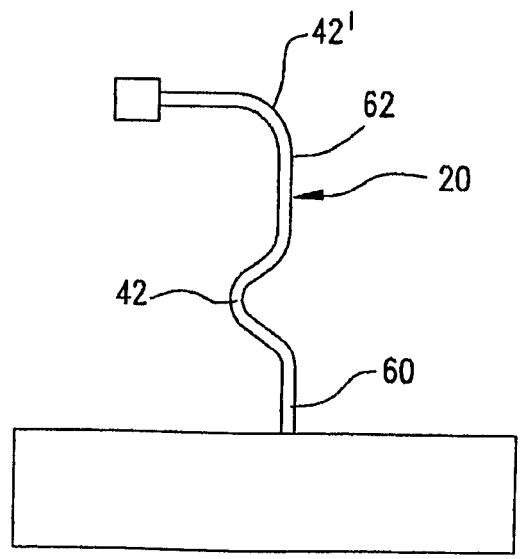
FIG. 6 is a top plan view of a further possible pattern which the optical ribbon of the present invention can be routed.

To form the optical ribbon 20, as shown in FIG. 2, the optical fibers 24a, 24b, 24c, 24d are laid down in a predetermined pattern on a substrate 32 coated with adhesive 34. The substrate 32 may be a plastic film. Such adhesive coated substrates 32/34 are well-known in the art. The predetermined pattern can include a variety of shapes. The predetermined pattern can include a curved section 42 such that the resulting optical ribbon 20 will have a curve therein as shown in FIGS. 1, 5 and 6. As shown in FIG. 1, if the optical ribbon 20 is being used on a printed wiring board 22, the predetermined pattern is dictated by the locations of the components 40, such as ASICs and/or a heat sink, on the printed wiring board 22 such that the optical ribbon 20 will be routed around the components 40. This allows the resulting optical ribbon 20 to be manufactured such that it connects to a pair of connectors 36, 38 at the ends thereof and can be routed around the components 40. If the optical ribbon 20 is being used in a different final assembly, the predetermined pattern may be dictated by other constraints. For example, as shown in FIG. 5, the optical ribbon 20 which includes the straight section 44, the curved section 42 and the straight section 46 which is generally perpendicular to the straight section 44 can be used to manage curves; the optical ribbon 20 which includes the straight section 48, the curved section 42 which forms a set-off and the straight section 50 can be used to avoid an object 52; the optical ribbon 20 which includes the straight section 54, the curved section 42 and the straight section 56 can be used to align with a transceiver 58.

Thereafter, the optical fibers 24a, 24b, 24c, 24d are substantially encapsulated with the conformal coating 26 by suitable known means to form a generally flat ribbon shape. As shown, only the portion of the optical fibers 24a, 24b, 24c, 24d that contact the adhesive coated substrate 32/34 are not coated with the conformal coating 26. In addition, the ends of the optical ribbon 20 are not necessarily coated with the conformal coating 26 such that the ends can be mated to a connector 36, 38. The conformal coating 26 is a silicone-based chemical compound and such conformal coatings are well-known in the art. The conformal coating 26 is flexible so that the resulting optical ribbon 20 will be flexible.

Figure 3:
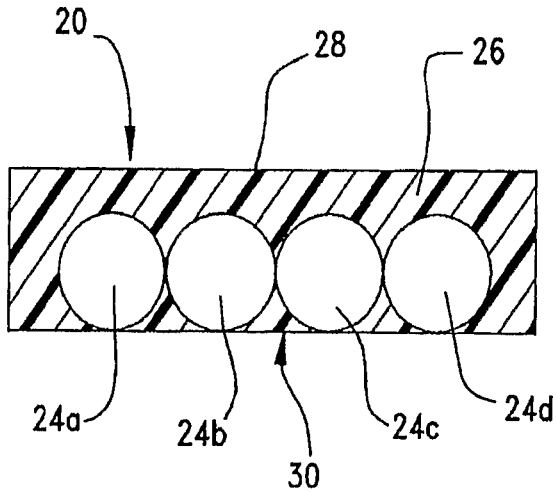
FIG. 3 is a cross-sectional view of the optical ribbon of FIG. 1.

Next, as shown in FIG. 3, the optical ribbon 20 is removed from the adhesive coated substrate 32/34. If the ends of the optical ribbon 20 were coated with the conformal coating 26, the conformal coating 26 is stripped therefrom by suitable means so that the ends can be mated to a connector 36, 38.

As a result, a generally flat, flexible optical ribbon 20 is simply manufactured. The flat optical ribbon 20 can be placed on a printed wiring board 22 with much greater accuracy and without torsional stress versus the prior art. The curved section 42 provides better on board fiber management solutions.

Even if the optical ribbon 20 is not being routed around a component 40 on a printed wiring board 22, the curved section 42 can be included between a pair of straight sections 60, 62 as shown in FIGS. 5 and 6, as a built-in ferrule retermination loop, while maintaining the lead length requirements. Instead of decreasing proportionally with the number of leads, the yield of the optical ribbon 20 with high lead count and tight lead length tolerances can be reduced to levels better than that of a single lead with no retermination allowance. As a result of the built-in ferrule retermination loop formed by the curved section 42, if it is determined that the end of the optical ribbon 20 is not acceptable for termination to a ferrule as a result of manufacturing deficiencies, the end of the optical ribbon 20 can be cut until an acceptable face is presented by the optical fibers 24a, 24b, 24c, 24d for termination to a ferrule. At least a portion of the conformal coating 26 is removed from the optical fibers 24a, 24b, 24c, 24d in the curved section 42 to define a removed section. The predetermined pattern in which the optical fibers 24a, 24b, 24c, 24d are provided is altered, such as by straightening the optical fibers 24a, 24b, 24c, 24d to lengthen the optical ribbon 20 back to its original length. The optical fibers 24a, 24b, 24c, 24d can be laid down on an adhesive coated substrate 32/34 to form the new pattern. After the pattern has been altered, a new conformal coating 26 is applied to the altered section to at least substantially encapsulate the optical fibers 24a, 24b, 24c, 24d. As a result, the optical ribbon 20 does not need to be discarded. FIG. 6 also shows the combination of the built-in ferrule retermination loop 42, 60, 62 and a secondary curved section 42' which allows curves to be managed.

The optical ribbon 20 provides numerous benefits: 1. Optical ribbons that bend flat can be accurately and repeatedly manufacture optical ribbons. 2. The curved section can be installed with no intra-ribbon stress, thereby increasing the life expectancy of the optical ribbon 20. 3. Precise, permanent and repeatable routing the optical ribbon 20 can be achieved, ensuring clearance with other components on the printed wiring board 22. 4. The maximal height in the curved section 42 enables higher fiber density and simplifies design constraints (and design time). 5. The optical ribbon 20 naturally keeps the shape it is intended to follow once assembled in a system. This makes the system assembly and verification easier.

Figure 4:
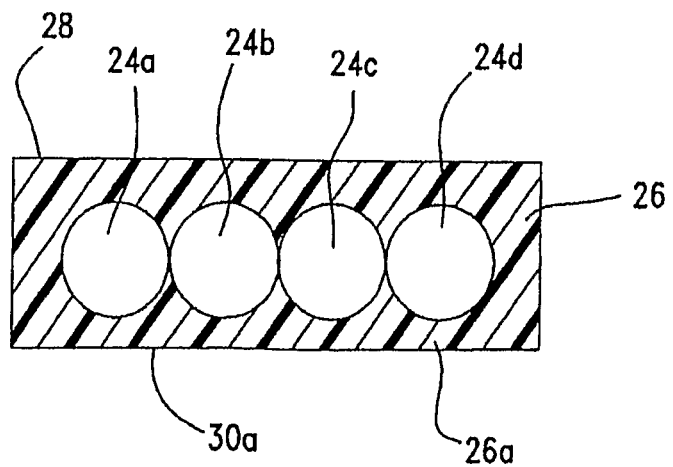
FIG. 4 is a cross-sectional view of the optical ribbon of FIG. 1 showing a further possible step of manufacture.

A further step in the manufacture of the optical ribbon 20 is shown in FIG. 4. After the optical ribbon 20 is removed from the adhesive coated substrate 32/34 as shown in FIG. 3, a conformal coating 26a is applied to the lower surface 30 of the optical ribbon 20 such that the optical fibers 24a, 24b, 24c, 24d are completely encapsulated, except the ends of the optical ribbon 20 are not necessarily coated with the conformal coating 26/26a such that the ends can be mated to a connector 36, 38. If the ends of the optical ribbon 20 were coated with the conformal coating 26/26a, the conformal coating 26/26a is stripped therefrom by suitable means so that the ends can be mated to a connector 36, 38. The conformal coating 26a may become integral with the conformal coating 26.

As a result of the construction and manufacture of the present optical ribbon 20, substrates are not required as provided in the prior art, specifically U.S. Pat. No. 4,496,215 to Shaheen et al. This reduces the cost of manufacture of the present optical ribbon 20 versus the prior art.

While preferred embodiments of the present invention are shown and described, it is envisioned that those skilled in the art may devise various modifications of the present invention without departing from the spirit and scope of the appended claims.

The invention claimed is:
1. A method, the method comprising:
adhering at least one optical fiber in a predetermined pattern on an adhesive coated substrate, thereby defining an exposed portion of each optical fiber, the predetermined pattern including a generally curved section and a generally straight section;

substantially coating the exposed portion with a conformal coating, thereby forming a ribbon;

removing the adhesive coated substrate from the ribbon;

providing a printed wiring board, the printed wiring board having a surface;

placing the ribbon on the surface;

mounting a component to the surface; and placing the generally curved section proximate the component such that the optical ribbon is routed around the component on the printed wiring board.

2. The method of claim 1, wherein after the adhesive coated substrate is removed, coating at least a portion of the ribbon with a conformal coating to substantially encapsulate each optical fiber.

3. The method of claim 1, wherein after the adhesive coated substrate is removed, removing at least a portion of the conformal coating from each optical fiber to define a removed section.

4. The method of claim 3, further comprising re-applying a conformal coating to the removed section.

5. The method of claim 1, further comprising removing at least a portion of the conformal coating from each optical fiber in the curved section.

6. The method of claim 1, further comprising altering the shape of the curved section to define an altered shape section.

7. The method of claim 6, further comprising re-applying a conformal coating to the altered shape section.

8. A combination, the combination comprising:

a printed wiring board having a surface;

a component mounted to the surface; and an optical ribbon, the optical ribbon including at least one optical fiber and a conformal coating at least substantially encapsulating each optical fiber, the optical ribbon having a generally curved section which has upper and lower surfaces and a generally straight section which has upper and lower surfaces, the upper surfaces being in the same plane and the lower surfaces being in the same plane, the lower surfaces being in direct contact with the surface such that a substrate is not provided between the conformal coating and the surface, the generally curved section being positioned proximate the component such that the optical ribbon is routed around the component.

9. The combination of claim 8, wherein the conformal coating is flexible.

10. The combination of claim 8, wherein the conformal coating is a silicon resin.

11. The combination of claim 8, wherein the conformal coating substantially encapsulates each optical fiber.

\* \* \* \* \*